United States Patent Office 3,267,049
Patented August 16, 1966

3,267,049
PHOSPHORUS POLYURETHANE PLASTIC PREPARED FROM A HYDROXYL PHOSPHORUS COMPOUND
Hans Holtschmidt, Cologne-Stammheim, Günther Braun, and Rudolf Merten, Cologne-Flittard, and Günther Nischk, Leverkusen, Germany, assignors to Farbenfabriken Bayer Aktiengesellschaft, Leverkusen, Germany, a German corporation
No Drawing. Filed May 7, 1962, Ser. No. 192,963
Claims priority, application Germany, Aug. 26, 1960, F 31,984; Apr. 25, 1961, F 33,749; May 6, 1961, F 33,879
8 Claims. (Cl. 260—2.5)

This application is a continuation-in-part of our copending application serial No. 133,031, filed August 22, 1961, now abandoned.

This invention relates to phosphorus compounds, and more particularly, to high molecular weight hydroxyl phosphorus compounds suitable for reaction with organic polyisocyanates to prepare polyurethane plastics and to said polyurethane plastics.

Hydroxyl phosphorus compounds have been prepared heretofore which contained phosphoric acid ester linkages. One heretofore known process is to react an aryloxy phosphoric acid dichloride with a dihydroxy phenol. The resulting hydroxyl phosphorus compounds have terminal phenolic hydroxyl groups which yield thermally unstable polyurethane plastics. Moreover, the transesterification of trialkyl phosphates with polyhydric alcohols has been proposed hereto but these reactions have not proven satisfactory to prepare hydroxyl phosphorus compounds because the transesterification is very difficult to bring about and numerous side reactions are also produced.

It is desirable to produce polyurethane plastics which are flame-resistant by using phosphorus containing components or additives. Phosphorus containing polyisocyanates have been used heretofore as well as trialkyl phosphites as additives to impart improved flame-resistance to polyurethane plastics. The non-reactive trialkyl phosphites tend to exude out of the product. The phosphorus containing polyisocyanates are sometimes difficult to prepare and do not always have desirable viscosities. Moreover, the polyurethane plastics produced from the phosphorus containing polyisocyanates may be brittle.

It has also been proposed heretofore to prepare phosphorus ester compounds which have an aliphatic ester bond to the phosphorus atom. The aliphatic phosphorus ester bond is not as stable against hydrolytic influence as desirable for the production of polyurethane plastics.

It is therefore an object of this invention to provide hydroxyl phosphorus compounds and polyurethane plastics prepared therefrom which are easier to prepare and which have improved physical properties. Another object of this invention is to provide an improved polyhydroxy compound containing phosphoric acid ester groupings which are especially adapted for the production of polyurethane plastics. Another object of this invention is to provide hydroxyl phosphoric acid ester compounds which have excellent resistance to hydrolysis. Another object of this invention is to provide an improved process for the preparation of hydroxyl phosphorus compounds. Still a further object of this invention is to provide polyurethane plastics which are difficult to ignite. A further object of this invention is to provide an improved process for the preparation of polyurethane plastics including cellular polyurethane plastics and non-porous poyurethane plastics which may be castings, moldings, coatings and the like.

The foregoing objects and others which will become apparent from the following description are accomplished in accordance with the invention, generally speaking, by providing hydroxyl phosphorus compounds and reaction products thereof with organic polyisocyanates to prepare polyurethane plastics. The hydroxyl phosphorus compounds have a molecular weight of at least about 600 and preferably from about 600 to about 10,000 and are prepared by a process which comprises reacting a polyhydric alcohol with a phosphoric acid ester having the formula

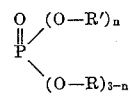

wherein R is an organic radical, R′ is an aromatic radical having at least one aliphatic substituent and n is an integer of from 1 to 3, said phosphoric acid ester containing at least one halogen atom in at least one of the aliphatic substituents in said aromatic radical designated R′ in the formula. It is not possible to assign a chemical formula to each and every product produced when the phosphoric acid esters are reacted with a polyhydric alcohol according to the invention. However, some products within the scope of the invention may be identified such as, for example, the hydroxyl phosphorus compounds having a molecular weight of from about 600 to about 10,000 which have the formula

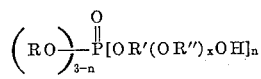

wherein R is a monovalent organic radical, R′ is an aromatic radical having at least one aliphatic substituent, R″ is a divalent aliphatic radical, n is an integer of from 1 to 3 and x is an integer which may be the same or different and is sufficient to yield a molecular weight of from about 600 to about 10,000 for the whole compound. Another type of product is the compound having the formula

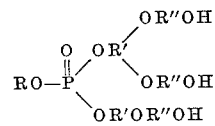

wherein R, R′ and R″ have the meanings set forth above. A preferred compound within the scope of the invention is the hydroxyl phosphorus compound having the formula

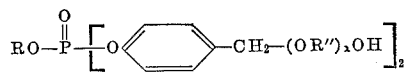

wherein R is alkyl, R″ is alkylene and x is an integer which may be the same or different and is sufficient to yield a molecular weight of from about 600 to about 10,000 for the whole compound.

In the foregoing formulas, R may be any suitable organic radical and preferably has from 1 to 20 carbon atoms including aliphatic, aromatic and heterocyclic radicals such as, for example, alkyl, alkenyl, alkynyl, aralkyl, alkaryl, aryl, aralkenyl, cycloalkyl, cycloalkenyl and heterocyclic radicals based on oxygen, sulfur, nitrogen and the like. Any suitable alkyl radical may be R such as, for example, methyl, ethyl, n-propyl, isopropyl, n-butyl, isobutyl, sec-butyl, t-butyl, n-amyl and the various positional isomers thereof such as, for example, 1-methylbutyl, 2-methyl-butyl, 3-methyl-butyl, 1,1-dimethylpropyl, 1,2-dimethyl-propyl, 2,2,-dimethyl-propyl, 1-ethylpropyl; the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like. Any suitable alkenyl radical may be used such as, for example, ethenyl, 1-propenyl, 2-propenyl, isopropenyl, 1-butenyl, 2-butenyl, 3-butenyl, heptenyl and the like including eicosenyl. Any suitable alkynyl radical may be used such as for example, ethynyl, 2-propynyl and the like. Any suitable aralkyl radical may be used such as, for example, benzyl, alpha-phenyl-ethyl, beta-phenyl-ethyl, alpha-phenyl-propyl, beta-phenyl-propyl, gamma-phenyl-propyl, alpha-phenyl-isopropyl, beta-phenyl-isopropyl, alpha-phenyl-butyl, beta-phenyl-butyl, gamma-phenyl-butyl, delta-phenyl-butyl, alpha-phenyl-isobutyl, beta-phenyl-isobutyl, gamma-phenyl-isobutyl, alpha-phenyl-sec-butyl, beta-phenyl-sec-butyl, gamma-phenyl-sec-butyl, beta-phenyl-t-butyl, alpha'-naphthyl-methyl, beta'-naphthyl-methyl and the like. Any suitable alkaryl radical may be used such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl and the like. Any suitable aryl radical may be used such as, for example, phenyl, alpha-naphthyl, beta-naphthyl, alpha-anthryl, beta-anthryl, gamma-anthryl and the like. Any suitable aralkenyl radical may be used such as, for example, alpha-phenyl-ethenyl, beta-phenyl-ethenyl, alpha-phenyl-1-propenyl, beta-phenyl-1-propenyl, gamma-phenyl-1-propenyl, alpha-phenyl-2-propenyl, beta-phenyl-2-propenyl, gamma-phenyl-2-propenyl, beta-phenyl-isopropenyl and the like. Any suitable cycloalkyl radical may be the organic radical such as, for example, cyclopropyl, cyclobutyl, cycloamyl, cyclohexyl, cycloheptyl, cyclooctyl and the like. Any suitable cycloalkenyl radical may be used as the organic radical such as, for example, alpha-cyclohexyl-ethenyl, beta-cyclohexyl-ethenyl and the like. Any suitable heterocyclic radical containing oxygen, sulfur, nitrogen and the like may be the organic radical such as, for example, furyl, pyranyl, thienyl, benzothienyl, indolyl, pyrinidinyl and the like.

Any suitable aromatic radical which has at least one aliphatic substituent may be the organic radical R' in the foregoing formulas. The radical R' has a valence of at least two. One valence is to the oxygen atom in the formula and, where R' is in the polyhydric alcohol, the balance of the valences which may be one or more are bonded to halogen atoms and are replaced with oxyalkylene radicals in the reaction with the polyhydric alcohol. The radical R' in the formula is one of the hydroxyl phosphorus compounds which may be divalent or higher polyvalent depending on the number of halogen atoms which were originally bonded to the radical and further, on the number of halogen atoms which have been replaced by the polyhydric alcohol. Generally speaking, any of the aralkyl or aralkenyl atoms substituted on the side chain with a halogen atom may be the radical R' in the formulas. It is preferred that the radical R' have 1 or 2 aliphatic substituents containing from 1 to 10 carbon atoms and the most preferred radicals which may be R' in the hydroxyl phosphorus compound are those having the formula

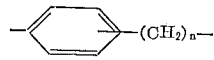

wherein n is from 1 to 8. Thus, the radical R' may be

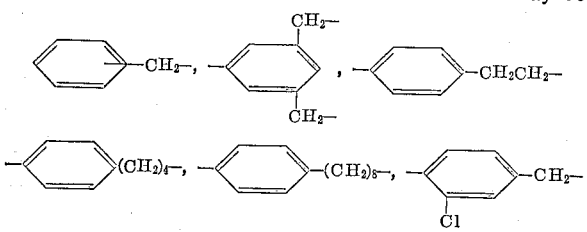

and the like.

Any suitable divalent aliphatic radical may be R'' in the formulas including for example ethylene, propylene, butylene, propenylene, ethyl ethenylene, tetramethylene, pentamethylene, hexamethylene and the like. It is also possible to use divalent aliphatic radicals which contain heterocyclic atoms such as, for example, sulfur, nitrogen, oxygen and the like such as the radicals

—CH$_2$CH$_2$—S—CH$_2$CH$_2$— and

—CH$_2$CH$_2$—N(CH$_3$)—CH$_2$CH$_2$—

—CH$_2$CH$_2$—O—CH$_2$CH$_2$— and the like.

It is convenient to begin the preparation of the hydroxyl phosphorus compounds of the invention with an alkyl-aryl phosphate such as, for example, the compounds having the formulas

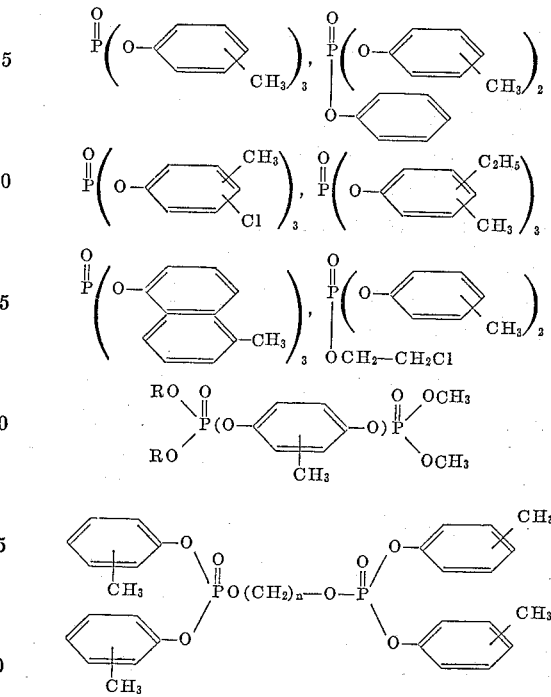

and the like, wherein R is methyl or ethyl and n is 1 to 10, inclusive.

The halogenation is carried out under the usual conditions and is a side chain halogenation and preferably a chlorination or bromination. Side chain halogenations are performed as is well known by heating, by irradiating with ultra-violet light or in the presence of peroxides such as dibenzoyl-peroxide or aliphatic azo compounds such as diazomethane. It is also possible to halogenate the aromatic nucleus in a first step in the presence of iodine or ferric chloride and then to bring about halogenation of the side chains. Moreover, the side chain may be halogenated to introduce one or more halogen atoms. Under the etherification conditions more fully described below, a linking of the aralkyl phosphate with the polyfunctional alcohol takes place according to the number of halogen atoms in the side chain.

If a side chain contains one halogen atom like Ar—CH$_2$Cl a true ether linkage is formed by the reaction with the polyhydric alcohol under splitting off hydrogen halide. The reaction can be represented as

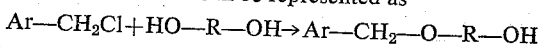

If, however, a side chain contains two halogen atoms the product of the etherification reaction can be looked at as forming an acetal configuration as easily is understood from the equation

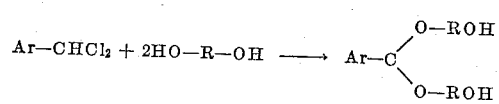

In a similar way reaction with a side chain containing three halogen atoms connected to one carbonatom results in an orthoester configuration which is liable to transform into the usual ester group like this

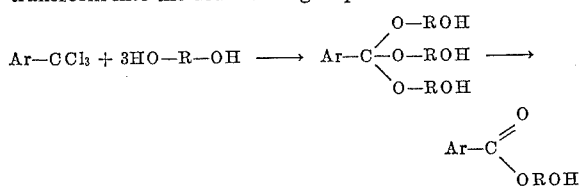

The halogenated alkyl-aryl phosphates described above may be reacted with the polyhydric alcohol in several ways. One way of carrying out the reaction is to react halogen phosphates with polyhydric alcohols directly, in which case a hydrogen halide is split off, or with mono-alcoholates of the polyhydric alcohols. It is possible to use tertiary bases such as triethyl amine as hydrogen halide acceptors. Still further, one may prepare compounds based on the phosphate esters which have the general formula

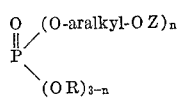

wherein R and $n$ have the meanings set forth above and Z is a lower alkyl radical such as methyl, ethyl, propyl, and the like, by reaction of the phosphoric acid ester with a lower alcohol such as methanol or ethanol and then the alcoholate having the formula set forth above can be transesterified in the presence of a transesterification catalyst such as p-toluene sulfonic acid, boron trifluoride and the like with polyhydric alcohols to prepare the hydroxyl phosphorus compounds of the invention.

However, the preferred method which is the simplest and easiest to carry out industrially is the direct action of polyhydric alcohols on the halogenated alkyl-aryl phosphates in the presence of an alkyene oxide such as ethylene oxide, propylene oxide, and the like as hydrogen halide acceptors. The procedure in this case is that the corresponding halogenated alkyl-aryl phosphate is mixed with the polyhydric alcohol and the mixture is heated preferably to from about 140° C. to about 180° C. An alkylene halohydrin is formed with the alkylene oxide and is distilled off. The process of using ethylene oxide and propylene oxide as hydrogen halide acceptors is described in German Patent 1,072,392.

Any suitable polyhydric alcohol may be used as the reactant with the halogenated alkyl-aryl phosphate compound, such as, for example, ethylene glycol, propylene glycol, butylene glycol, trimethylolpropane, pentaerythritol, 1,2,6 - hexanetriol glycerine, 1,5 - naphthylene-beta - dihydroxyethyl ether, the bis - hydroxyethyl ether of hydroquinone as well as polyhydric alcohols which have been reacted with isocyanates to contain urethane groups, amino alcohols such as ethanol amine which have been reacted with acids so that they can contain carbonamide groups or isocyanates so that they contain urea groups as well as those compounds which contain ether oxygen such as, for example, diethylene glycol, triethylene glycol, dipropylene glycol and the like and compounds which contain thioether atoms such as, for example, thiodiglycol and the like as well as those compounds which contain ester groups such as, for example, the reaction product of one mol of ricinoleic acid and one mol of ethylene glycol and those compounds which contain tertiary nitrogen atoms such as, for example, N,N-di(beta-hydroxyethyl aniline) and the like. It is also possible to use polyethers, polyesters, polythioethers and the like which contain terminal hydroxyl groups such as, for example, the condensation product of alkylene oxides such as ethylene oxide, propylene oxide, butylene oxide, and the like, the reaction products of polyhydric alcohols with polycarboxylic acids to prepare hydroxyl polyesters such as, for example, the reaction product of adipic acid, succinic acid, phthalic acid, terephthalic acid with, for example, butylene glycol, trimethylolpropane and the like and the condensation products of thiodiglycol ether with itself or with a small amount of a polyhydric alcohol as set forth above. The polyhydric alcohol preferably has a molecular weight below about 500 and preferably has from 2 to 4 hydroxyl groups.

According to a specific embodiment of the invention, however, it is possible to use mono- and oligsaccharides as a polyhydric alcohol component. Such monosaccharides are glucose, fructose, mannose, formose, galactose and invert sugars. Suitable oligosaccharides include saccharose, maltose, cellobiose, lactose and acid-treated low molecular weight starch and cellulose degradation products. Of course these materials can be used alone or together with other polyhydric alcohols such as ethylene glycol, propylene glycol, diethylene glycol, triethylene glycol, tetraethylene glycol, dipropylene glycol, glycero, butanediol, butenediol, butinediol, hexanediol, hexanetriol, butanetriol, trimethylol ethane, trimethylol propane, pentaerythritol, sorbitol and mannitol. It is even possible to concurrently use small amounts of a monofunctional alcohol.

Suitable polyalcohols are also the under acid conditions prepared solutions of oligosaccharides in polyvalent alcohols as described in Belgian Patent 596,556.

According to another specific embodiment of the invention it is possible to vary the preparation of the hydroxyl phosphorus compounds of the invention by an additional Arbusow reaction with a trialkyl phosphite after the side chain halogenation and before reacting the halogenated alkylaryl phosphate with the polyhydric alcohol. This additional step can be made in all cases, where the halogenated alkylaryl phosphate contains at least 2 halogen atoms. A part of these halogen atoms are consumed by the Arbusow reaction with a trialkyl phosphite, while the others are left to react with the polyhydric alcohol. It is to be understood that these specific phosphoric acid esters are also included in the general formula

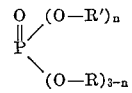

The organic radical R' now includes aryl alkyl radicals having phosphorus atoms directly attached to the carbon atom of the alkyl group, in other words the organic radical includes those having a phosphonic ester group derived from the Arbusow-reaction. The hydroxyl phosphorus compounds produced by this specific mode of preparation exhibits a lower viscosity than those prepared according to the invention, but without an additional Arbusow reaction. This is an advantage, especially if the polyurethane is made with machinery. Another remarkable advantage of this specific mode of preparing the hydroxyl phosphorus compounds is their high phosphorus content. Suitable trialkyl phosphites include trimethyl phosphite, triethyl phosphite, trichloro ethyl phosphite, tribromo ethyl phosphite and triallyl phosphite.

More specifically, the halogenated alkyl aryl phosphate may be reacted with a trialkyl phosphite including saturated lower alkyl, unsaturated, such as lower alkenyl, and halogenated lower alkyl or lower alkenyl phosphites to yield an additional linkage through a direct carbon to phosphorus bond. Some of these compounds may be represented by formula such as

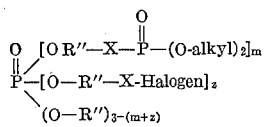

wherein R'' now is the aryl radical originally contained in R', X is an alkylene radical (originally the alkyl group attached to the aryl group in R'), $m$ is 1 or 2, $z$ is 1 or 2, the sum of $m+z$ being not greater than 3. The aryl radicals may be any of those set forth above. The alkylene radical may be ethylene, propylene, butylene and the like. A specific intermediate compound is therefore

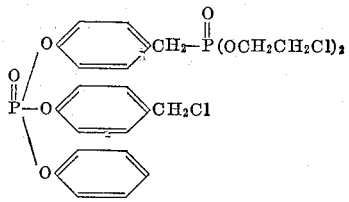

The hydroxyl phosphorus compounds of the invention have a molecular weight of from about 600 to about 10,000 and preferably have an hydroxyl number within the range of from about 40 to about 500. They are an improvement over the heretofore known polyhydroxyl compounds containing phosphorus because they have a substantially lower viscosity thus making them easy to mix with the organic polyisocyanates. The polyurethane plastics produced from the polyhydroxyl compounds have excellent resistance to hydrolysis and are adapted to impart flame-resistance and high tensile strength to polyurethane plastics. Still further, they are produced industrially by convenient and straightforward methods.

The hydroxyl phosphorus compounds of the invention are useful for the preparation of polyurethane plastics which may be used for both sound and thermal insulation for gaskets, moldings, coatings for wood, metal and the like.

It is to be understood that if the hydroxyl phosphorus compounds of the invention are to be most effective in imparting flame-resistance to polyurethane plastics, they must contain more than one hydroxyl group and, if they are to contain more than one hydroxyl group, there must be at least two halogenated substituents on the aliphatic ring or there must be at least two halogen atoms on one substituent so that the polyhydric alcohol may react at more than one site releasing a hydrogen halide and yielding more than one free hydroxyl group. If the hydroxyl phosphorus compounds are used alone for reaction with an organic polyisocyanate, then it is essential that there be at least two hydroxyl groups per molecule of the hydroxyl phosphorus compounds.

The invention also contemplates polyurethane plastics which are prepared by the reaction of the hydroxyl phosphorus compounds with organic polyisocyanates. The polyurethane plastics may be either porous or non-porous and for their production, any suitable organic polyisocyanate may be used such as, for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, Ethylene diisocyanate,
Ethylidene diisocyanate,
Propylene-1,2-diisocyanate,
Cyclohexylene-1,2-diisocyanate,
m-Phenylene diisocyanate,
2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
p,p',p''-Triphenylmethane triisocyanate,
1,5-naphthylene diisocyanate,
Furfurylidene diisocyanate or polyisocyanates in a blocked or inactive form such as the Bis-phenyl carbamates of 2,4- or 2,6-toluylene diisocyanate,
p,p'-Diphenylmethane diisocyanate,
p-Phenylene diisocyanate,
1,5-naphthylene diisocyanate,
p,p',p''-Triisocyanato phenyl phosphate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

It is not necessary to use the hydroxyl phosphorus compounds alone. They may be used in conjunction with an active hydrogen containing compound containing active hydrogen containing groups as determined by the Zerewitinoff method, for example, polyhydric polyalkylene ethers, hydroxyl polyesters, polyhydric polythioethers and the like. Any suitable polyhydric polyalkylene ether may be used such as, for example, the condensation product of an alkylene oxide or of an alkylene oxide with a polyhydric alcohol as more particularly set forth above. Hydroxyl polyesters suitable for mixture with the hydroxyl phosphorus compounds may be obtained from any suitable polycarboxylic acid reacted with any suitable polyhydric alcohol such as, for example, adipic acid, sebacic acid, succinic acid, terephthalic acid, and the like, reacted with such polyhydric alcohols as ethylene glycol, 1,3-propylene glycol, 1,4-butylene glycol, trimethylolpropane, glycerine, 1,2,6-hexanetriol and the like. Any suitable polyhydric polyethioether may be used such as, for example, the condensation product of thiodiglycol or the reaction product of a polyhydric alcohol with any other suitable thioether glycol. Suitable thioether glycols are disclosed in U.S. Patents 2,862,972 and 2,900,368.

The production of cellular polyurethane plastics in accordance with the invention is carried out by combining the organic polyisocyanate with the hydroxyl phosphorus compound in the presence of a blowing agent. Suitable machinery for carrying out the process is disclosed in Reissue Patent 24,514. Any suitable blowing agent may be used such as, for example, a halohydrocarbon such as, for example, dichlorodifluoromethane, trichlorofluoromethane or water may be included in the reaction mixture together with sufficient excess of organic polyisocyanate to bring about a reaction to produce carbon dioxide which will act as a blowing agent to produce a cellular polyurethane plastic. It is possible to react the components in a single stage wherein the organic polyisocyanate and hydroxyl phosphorus compound are intimately mixed and allowed to react to produce a cellular polyurethane plastic or a prepolymer may be prepared by first reacting an excess of the organic polyisocyanate with the hydroxyl phosphorus compound and then combining this product with water or additional cross-linking agent in the presence of a blowing agent to produce a cellular polyurethane plastic. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

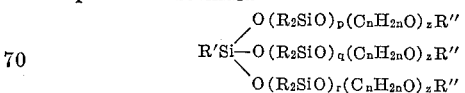

wherein R, R' and R'' are alkyl radicals having 1 to 4 carbon atoms, $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with z equal to from about 26 to about 34. Most preferred is a compound having the formula

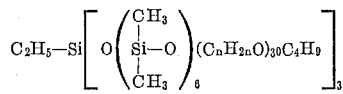

wherein ($C_nH_{2n}O$) is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N,-diethyl-3-diethyl amino propyl amine, dimethyl benzyl amine and the like. Other suitable catalysts are for example tin compounds such as stannous chloride, tin salts of carboxylic acids, such as dibutyl tin di-2-ethyl hexoate, tin alcoholates such as stannous octoate, as well as other organo metallic compounds such as are disclosed in U.S. Patent 2,846,408.

Non-porous polyurethane plastics which may be castings or moldings are prepared by reacting an excess of the organic polyisocyanate with the hydroxyl phosphorus compound and an organic cross-linking agent such as a polyhydric alcohol, a polyamine or the like under substantially anhydrous conditions. Any suitable organic cross-linking agent may be used such as, for example, ethylene glycol, 1,3-propylene glycol, 1,4-butylene glycol, 1,3-butylene glycol, trimethylolpropane, ethylene diamine, ethanol amine and the like, as well as mixtures of these.

Coating compositions particularly adapted to coating wood, metal, rubber and the like may be prepared by reacting an organic polyisocyanate with the hydroxyl phosphorus compounds of the invention in an inert organic solvent therefor. Any suitable inert organic solvent may be used such as, for example, xylene, toluene, diethyl ether of ethylene glycol, ethyl acetate of ethylene glycol, monoethyl ether acetate and the like. Any suitable substrate may be coated with the coating compositions of the invention including wood, paper, porous plastics, such as, for example, sponge rubber, cellular polyurethane plastics, foamed polystyrene and the like. The coating compositions may contain any suitable pigment such as, for example, iron oxide, carbon black, titanium dioxide, zinc oxide, chrome green, lithol red and the like.

The invention is further illustrated by the following examples in which the parts are by weight unless otherwise indicated.

*Example 1*

About 232 parts of chlorine are introduced into about 1104 parts of industrial tricresyl phosphate while irradiating with ultra-violet light at a temperature from about 80 to about 120° C. About 975 parts of the chlorinated tricresyl phosphate are then mixed with about 785 parts of trimethylolpropane, the mixture heated to about 140 to about 170° C. and a powerful stream of ethylene oxide is introduced. The ethylene chlorohydrin formed in the reaction is then distilled off. After a reaction period of about 4 hours, the reaction mixture is exhausted under nitrogen and a water jet vacuum of about 20 mm. Hg is applied for another hour in order to complete the reaction. The viscous brown-colored oil thus obtained has an —OH number of about 394.

About 100 parts of this product are thoroughly mixed with about 2 parts of permethylated aminoethyl piperazine, about 6 parts of sodium castor oil sulphate (50% water) and about 0.3 part of a silicone oil having the formula

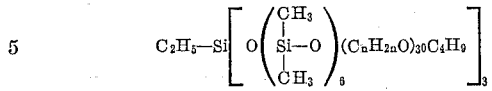

wherein ($C_nH_{2n}O$) is a mixed polyoxyethylene and oxypropylene block copolymer containing about 17 oxyethylene units and about 13 oxypropylene units. This mixture is thereafter stirred with about 154 parts of 4,4'-diphenylmethane diisocyanate and introduced into molds. A fine-pored incombustible foam which has the following physical properties is obtained:

| | |
|---|---|
| Weight per unit volume _____ kg./m.³__ | 43 |
| Compressive strength _____ kg./cm.²__ | 3 |
| Impact toughness _____ kg./cm__ | 0.3 |
| Hot-bending strength _____ ° C__ | 153 |
| Water absorption _____ percent__ | 1.4 |

*Example 2*

About 50 parts of the polyhydroxyl compound obtained as described in Example 1 are mixed with about 50 parts of propoxylated phosphoric acid (OH number about 397), about 1 part of permethylated aminoethyl piperazine, about 0.3 part of dibutyl-tin-dilaurate, about 0.3 part of the silicone oil of Example 1 and about 6 parts of sodium castor oil sulphate (50% water) and mixed while adding about 155 parts of 90 percent 4,4'-diphenylmethane diisocyanate obtained by the phosgenation of the crude amine obtained from formaldehyde and aniline in a ratio that gives 90 percent of the corresponding amine. A difficultly inflammable non-shrinking foam material having the following physical properties is obtained:

| | |
|---|---|
| Weight per unit volume _____ kg./m.³__ | 42 |
| Compressive strength _____ kg./cm.²__ | 2.8 |
| Impact toughness _____ kg./cm__ | 0.3 |
| Hot-bending strength _____ ° C__ | 125 |
| Water absorption _____ percent__ | 1.3 |

*Example 3*

(a) About 232 parts of chlorine are initially introduced, with about 1 percent of iodine (and in the cold state) into about 1104 parts of industrial tricresyl phosphate in order to chlorinate the aromatic nucleus. Thereafter, by raising the temperature to about 100° C. and irradiating with ultra-violet light, the side chain is chlorinated with the same quantity of chlorine. About 1350 parts of this chlorinated tricresyl phosphate are mixed with about 1060 parts of trimethylolpropane, the mixture is heated to about 140 to about 170° C. and a stream of ethylene oxide is introduced. After distilling off the ethylene chlorohydrin in vacuo, a dark brown oil (OH number about 397) is obtained.

(b) If, instead of introducing ethylene oxide, the mixture of about 1350 parts of the chlorinated tricresyl phosphate, prepared as above, and about 1060 parts of trimethylolpropane is heated with about 1000 parts of propylene oxide for three hours in an autoclave to about 160 to about 170° C., a light brown viscous oil (OH number about 370) is obtained after distilling off the excess propylene oxide and removing the propylene chlorohydrin in vacuo.

(c) A mixture of about 50 parts of each of the polyhydroxyl compounds with the OH numbers 397 and 370 prepared in (a) and (b), respectively are thoroughly mixed with about 1 part of permethylated aminoethyl piperazine, about 0.3 part of dibutyl-tin-dilaurate, about 6 parts of sodium castor oil sulphate (50% water) and about 0.3 part of the silicone oil of Example 1 and, after stirring with about 145 parts of 90 percent 4,4'-diphenylmethane diisocyanate as in Example 2 is poured into molds. A difficultly inflammable foam having the following physical properties is obtained:

Weight per unit volume _____kg./cm.³__ 50
Compressive strength _____kg./cm.²__ 3.2
Impact toughness _____kg./cm__ 0.3
Hot-bending strength _____° C__ 150
Water absorption _____percent__ 1.8

*Example 4*

1 mol of tricresyl phosphate is reacted with 3 mols of chlorine and the product is treated with nitrogen at 120 to 130° C. until the dissolved hydrogen chloride is removed. 30.3 parts of the product are heated to 190° C. while dropping in 32.5 parts of trichloroethylphosphite at such a rate that the exothermic Arbusow reaction is held between 190 and 200° C. Dichloroethane is evolved and distilled off. In order to complete the reaction the mixture is treated for 1 hour at 130 to 140° C. in vacuo. 45 parts of trimethylolpropane are added and the mixture is heated for 3 hours to 160° C. in vacuo.

80.6 parts of the polyhydroxyl compound with an OH-number of 389 and a viscosity of 2800 cp./50° C. are obtained.

60 parts of this product are thoroughly mixed with 40 parts of propoxylated ethylene diamine (OH-number 450), 1.5 parts of permethylated aminoethyl piperazine, 0.5 part of the silicone oil of Example 1. This mixture is thereafter stirred with 109 parts of 4,4'-diphenylmethane diisocyanate of Example 2 having incorporated 30 parts of trichlorofluormethane. A fine-pored incombustible foam is obtained which has the following physical properties:

Weight per unit volume _____kg./m.³__ 30
Compressive strength _____kg./cm.²__ 2.1
Impact toughness _____kg./cm__ 0.4
Hot-bending strength _____° C__ 110
Water absorption _____Percent 2.2

*Example 5*

943 parts of chlorinated tricresyl phosphate are reacted in an Arbusow reaction at 190 to 200° C. with 540 parts of trichloroethylphosphite as in Example 4. Thereafter a solution of 412 parts of pentaerythritol in 850 parts of triethylene glycol is added. At 170° C. nitrogen is passed through the reaction mixture. 2360 parts of the polyhydroxyl compound having an OH-number of 451 are obtained.

100 parts of this product are thoroughly mixed with 2 parts of permethylated aminoethyl piperazine, 0.3 part of dibutyl-tin-dilaurate, 0.3 part of the silicone oil of example 1 and 6 parts of sodium castor oil sulphate (50% water). This mixture is thereafter stirred with 166 parts of 4,4'-diphenylmethane diisocyanate of Example 2 and introduced into molds. An incombustible, non-shrinking, rigid foam is obtained which has the following physical properties:

Weight per unit volume _____kg./m.³__ 56
Compressive strength _____kg./cm.²__ 4.6
Impact toughness _____kg./cm__ 0.3
Hot-bending strength _____° C__ 161
Water absorption _____Percent 1.4

*Example 6*

A chlorinated tricresyl phosphate (3 mols chlorine to 1 mol of tricresyl phosphate) is prepared. To 943 parts of this material 540 parts of trichloroethylphosphite are added dropwise at 190 to 200° C. The ethylene chloride formed is distilled off and then 1600 parts of an invert sugar solution are added. The invert sugar solution is prepared by heating for four hours to 90° C. of 1030 parts of cane sugar, 2700 parts of diethylene glycol, 500 parts of water and 3 parts of 30 percent HBF₄, and subsequently concentrated at 90° C./12 torr. The reaction mixture is stirred for three hours at 120° C. and then ethylene oxide is introduced until an acid number of 11.1 is reached. 3380 parts of a dark-brown polyhydroxyl compound (OH-number 326) are obtained. 80 parts of this product are thoroughly mixed with 20 parts of propoxylated trimethylolpropane (OH-number 380), 1 part of permethylated aminoethyl piperazine, 0.3 part of the silicone oil of Example 1 and 6 parts of sodium castor oil sulphate (50% water). This mixture is thereafter stirred with 139 parts of 4,4'-diphenylmethane diisocyanate of Example 2. An incombustible foam is obtained with the following physical properties:

Weight per unit volume _____kg./m.³__ 45
Compressive strength _____kg./cm.²__ 2.7
Impact toughness _____kg./cm__ 0.4
Hot-bending strength _____° C__ 110
Water absorption _____Percent__ 3

*Example 7*

90 parts of the polyhydroxyl compound of Example 6 are thoroughly mixed with 10 parts of propoxylated ethylene diamine (OH-number 450), 1 part of permethylated aminoethyl piperazine, 0.3 part of the silicone oil of Example 1 and 6 parts of sodium castor oil sulphate (50% water). This mixture is thereafter stirred with 139 parts of 4,4'-diphenylmethane diisocyanate of Example 2 and introduced into molds. An incombustible rigid foam is obtained having the following physical properties:

Weight per unit volume _____kg./m.³__ 37
Compressive strength _____kg./cm.²__ 1.7
Impact toughness _____kg./cm__ 0.3
Hot-bending strength _____° C__ 107
Water absorption _____Percent__ 3.5

*Example 8*

943 parts of the chlorinated tricresyl phosphate of Example 6 are reacted with 1350 parts of trichloroethylphosphite in an Arbusow reaction. The product is then reacted as described in Example 6 at 120° C. with 2800 parts of an invert sugar solution. The invert sugar solution has been made by heating for three hours 2760 parts of cane sugar, 4800 parts of triethylene glycol, 1500 parts of water and 8 parts of 30 percent HBF₄ to 90° C. and subsequent concentration at 90° C./12 torr. 4582 parts of a thinly viscous dark-brown polyhydroxyl compound are obtained (OH number 337, acid number 11.3).

100 parts of this product are thoroughly mixed with 2 parts of permethylated aminoethyl piperazine, 0.3 part of the silicone oil of Example 1 and 6 parts of sodium castor oil sulphate (50% water). The mixture is thereafter stirred with 141 parts of 4,4'-diphenylmethane diisocyanate. A fine-pored incombustible rigid foam is obtained which has the following physical properties:

Weight per unit volume _____kg./m.³__ 52
Compressive strength _____kg./cm.²__ 3.7
Impact toughness _____kg./cm__ 0.5
Hot-bending strength _____° C__ 113
Water absorption _____Percent__ 2

*Example 9*

70 parts of the polyhydroxyl compound as described in Example 8 are thoroughly mixed with 30 parts of a polyester prepared from adipic acid, phthalic acid, oil acid and trimethylol propane (OH-number 370), 2 parts of permethylated aminoethyl piperazine, 0.3 part of the silicone oil of Example 1 and 6 parts of sodium castor oil sulphate (50% water). Foaming occurs when this mixture is combined with 142 parts of 4,4'-diphenylmethane diisocyanate of Example 2. An incombustible, fine-pored, rigid foam results, which has the following physical properties:

Weight per unit volume _____kg./m.³__ 39
Compressive strength _____kg./m.²__ 2.6
Impact toughness _____kg./cm__ 0.3
Hot-bending strength _____° C__ 123
Water absorption _____percent__ 3.9

Example 10

100 parts of the polyhydroxyl compound of Example 1 (OH-number 298) are diluted with 50 parts of ethyl acetate. This solution is combined with 125 parts of a 75 percent ethyl acetate solution (NCO-number 18) of the reaction product of 3 mols of toluylene diisocyanate and 1 mol of trimethylol propane. The obtained lacquer solution is brushed on to wood, glass or metal as a thin cover. The film becomes dry and non-tacky within 3 hours and exhibits good physical properties.

It is to be understood that any other suitable alkyl-aryl phosphate, polyhydric alcohol, organic polyisocyanate, alkylene oxide, catalyst, stabilizer or the like could have been used in the preceding examples providing that the teachings of the examples were followed and that the working examples are given only for the purpose of illustration.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic polyisocyanate with an hydroxyl phosphorus compound having a molecular weight of from about 600 to about 10,000 and an hydroxyl number of about 40 to about 500 which is prepared by a process which comprises reacting a polyhydric alcohol with a phosphoric acid ester having the formula

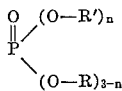

wherein R is an organic radical, R' is an aromatic radical having at least one aliphatic substituent and $n$ is an integer of from 1 to 3, said phosphoric acid ester containing at least one halogen atom in at least one of the aliphatic substituents in said aromatic radical designated R' in the formula.

2. A cellular polyurethane plastic prepared by a process which comprises reacting in the presence of a blowing agent an organic polyisocyanate with an hydroxyl phosphorus compound having a molecular weight of from about 600 to about 10,000 and an hydroxyl number of about 40 to about 500 which is prepared by a process which comprises reacting a polyhydric alcohol with a phosphoric acid ester having the formula

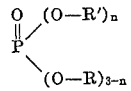

wherein R is an organic radical, R' is an aromatic radical having at least one aliphatic substituent and $n$ is an integer of from 1 to 3, said phosphoric acid ester containing at least one halogen atom in at least one of the aliphatic substituents in said aromatic radical designated R' in the formula.

3. A polyurethane plastic prepared by a process which comprises reacting under substantially anhydrous conditions an organic polyisocyanate with an hydroxyl phosphorus compound having a molecular weight of from about 600 to about 10,000 and an hydroxyl number of about 40 to about 500 which is prepared by a process which comprises reacting a polyhydric alcohol with a phosphoric acid ester having the formula

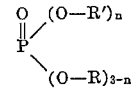

wherein R is an organic radical, R' is an aromatic radical having at least one aliphatic substituent and $n$ is an integer of from 1 to 3, said phosphoric acid ester containing at least one halogen atom in at least one of the aliphatic substituents in said aromatic radical designated R' in the formula.

4. A coating composition which comprises an inert organic solvent solution of the reaction product of an organic polyisocyanate with an hydroxyl phosphorus compound having a molecular weight of from about 600 to about 10,000 and an hydroxyl number of about 40 to about 500 which is prepared by a process which comprises reacting a polyhydric alcohol with a phosphoric acid ester having the formula

wherein R is an organic radical, R' is an aromatic radical having at least one aliphatic substituent and $n$ is an integer of from 1 to 3, said phosphoric acid ester containing at least one halogen atom in at least one of the aliphatic substituents in said aromatic radical designated R' in the formula.

5. The polyurethane plastic of claim 1 wherein said phosphoric acid ester has the formula

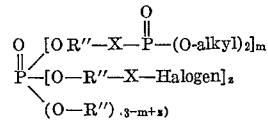

wherein R'' is an arylene radical, X is an alkylene radical, $m$ and $z$ are 1 or 2, the sum of $m$ and $z$ being at most 3.

6. A cellular polyurethane plastic prepared by a process which comprises reacting, in the presence of a blowing agent, an organic polyisocyanate with an hydroxyl phosphorus compound having a molecular weight of from about 600 to about 10,000 and an hydroxyl number of from about 40 to about 500 which has the formula

wherein R is a monovalent organic radical, R' is an aromatic radical having at least one aliphatic substituent, R'' is a divalent aliphatic radical, $n$ is an integer of from 1 to 3 and $x$ is an integer sufficient to yield a molecular weight of from about 600 to about 10,000.

7. The cellular polyurethane plastic of claim 2 wherein R' is

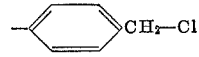

8. The cellular polyurethane plastic of claim 2 wherein R' is

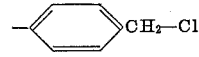

$n$ is 3 and said blowing agent is a halohydrocarbon.

References Cited by the Examiner

UNITED STATES PATENTS

| 2,764,565 | 9/1956  | Hoppe et al. | 260—2.5 |
| 2,830,069 | 4/1958  | Smith | 260—461.312 |
| 2,909,559 | 10/1959 | Lanham | 260—461.312 |
| 3,007,884 | 11/1961 | Kaplan et al. | 260—2.5 |
| 3,009,939 | 11/1961 | Friedman | 260—461 |
| 3,061,625 | 10/1962 | Friedman | 260—2.5 X |
| 3,134,742 | 5/1964  | Wismer | 260—2.5 |

LEON J. BERCOVITZ, *Primary Examiner.*

DONALD E. CZAJA, *Assistant Examiner.*